UNITED STATES PATENT OFFICE 2,414,119

PRODUCTION OF VANILLIC ACID

Irwin A. Pearl, Appleton, Wis., assignor, by mesne assignments, to Cola G. Parker, Neenah, Wis., as trustee No Drawing. Application April 3, 1944, Serial No. 529,425

6 Claims. (Cl. 260—521)

The present invention relates to the production of vanillic and closely related acids, and to an improved process for producing acids derived by oxidation from vanillin, ortho-vanillin, and syringaldehyde.

Most aldehydes may be transformed to the corresponding acids by common oxidizing agents or in the Cannizzaro reaction, but vanillin, ortho-vanillin, and syringaldehyde are exceptions and have been reported as not amenable to either reaction. Ordinary oxidizing agents either (1) have no action on the compound or (2) act as dehydrogenating agents, and yield the dehydrodicompound or (3) cause complete decomposition.

I have discovered that vanillin can be transformed to a vanillic acid salt without the formation of other undesirable products by treating it in hot aqueous alkaline solution with mercuric oxide. Expressed in terms of the net result, the reaction would be as follows:

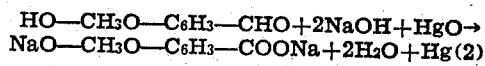

Subsequently, only acidification is required to secure the acid itself.

An example according to the invention is as follows:

Example I

To a hot solution, at or near 100° C., containing 2 moles, or 80 parts of sodium hydroxide and one mole or 216 parts of mercuric oxide in about 1,000 parts of water add one mole or 152 parts of vanillin with constant stirring. Continue the boiling under a reflux with stirring and when the reaction is complete allow to cool. This may require from two to seven hours of boiling. Acidify the cooled mass with sulfur dioxide, which will add a granular white precipitate to the solids already in the mass. Boil the mass, which will decompose the complex mercury compounds present, and filter the mixture hot to separate both vanillin and vanillic acid in the filtrate. The residue will contain all the mercury, which can be returned to any suitable recovery operation. Cool the filtrate to room temperature, 20° C., and filter out the precipitated vanillic acid, leaving unchanged vanillin in the filtrate. Neutralize the filtrate with sodium hydroxide and then acidify with a strong mineral acid, which will precipitate the unchanged vanillin, if desired. Alternatively the neutralized filtrate is ready to form part of a new charge. Under the conditions described above, about 30% of the original vanillin will remain unchanged and be available as part of a new charge.

Without further elaboration the foregoing will so fully explain the invention that others may readily adapt the same for use under various conditions of service.

I claim:

1. The cyclic method of producing vanillic acid from vanillin, which comprises: adding one mole of vanillin to a boiling-hot aqueous solution containing one mole of mercuric oxide and two moles of sodium hydroxide; refluxing for about seven hours; acidifying with sulfur dioxide; boiling for about ten minutes; filtering hot to separate vanillic acid and unreacted vanillin in the filtrate, from mercury in the precipitate; cooling to precipitate vanillic acid; returning the vanillin remaining in the solution to the first step above recited; and returning the mercury in the precipitate, in the form of oxide, to the first step above recited.

2. The cyclic method of producing vanillic acid from vanillin, which comprises: boiling vanillin in an aqueous solution containing mercuric oxide and sodium hydroxide; acidifying with sulfur dioxide; boiling to decompose complex mercury compounds; filtering hot to separate vanillic acid and unreacted vanillin in the filtrate, from mercury in the precipitate; cooling to precipitate vanillic acid; returning the vanillin remaining in the solution to the first step above recited; and returning the mercury in the precipitate, in the form of oxide, to the first step above recited.

3. The method of producing vanillic acid from vanillin, which comprises; boiling vanillin in an aqueous solution containing mercuric oxide and sodium hydroxide; acidifying with sulfur dioxide; boiling to decompose complex mercury compounds; filtering hot to separate vanillic acid and unreacted vanillin in the filterate, from mercury in the precipitate; and cooling to precipitate vanillic acid.

4. The cyclic method of producing the derived monocarboxylic acid from an aromatic aldehyde selected from the class comprising vanillin, ortho-vanillin and syringaldehyde, which comprises: adding one mole of the aldehyde to a boiling hot aqueous solution containing one mole of mercuric oxide and two moles of sodium hydroxide; refluxing for about two hours; acidifying with sulfur dioxide; boiling for about ten minutes; filtering hot to separate the monocarboxylic acid and unreacted aldehyde in the filtrate, from mercury in the precipitate;

cooling to precipitate the acid; returning the aldehyde remaining in the solution to the first step above recited; and returning the mercury in the precipitate, in the form of oxide, to the first step above recited.

5. The cyclic method of producing the derived monocarboxylic acid from an aromatic aldehyde selected from the class comprising vanillin, ortho-vanillin and syringaldehyde, which comprises: boiling the aldehyde in an aqueous solution containing mercuric oxide and sodium hydroxide; acidifying with sulfur dioxide; boiling to decompose mercury compounds; filtering hot to separate the monocarboxylic acid and unreacted aldehyde in the filtrate, from mercury in the precipitate; cooling to precipitate the acid; returning the aldehyde remaining in the solution to the first step above recited; and returning the mercury in the precipitate, in the form of oxide, to the first step above recited.

6. The method of producing the derived monocarboxylic acid from an aromatic aldehyde selected from the class comprising vanillin, ortho-vanillin and syringaldehyde, which comprises: boiling the aldehyde in an aqueous solution containing mercuric oxide and sodium hydroxide; acidifying with sulfur dioxide; boiling to decompose mercury compounds; filtering hot to separate the monocarboxylic acid and unreacted aldehyde in the filtrate, from mercury in the precipitate; and cooling to precipitate the acid.

IRWIN A. PEARL.